UNITED STATES PATENT OFFICE.

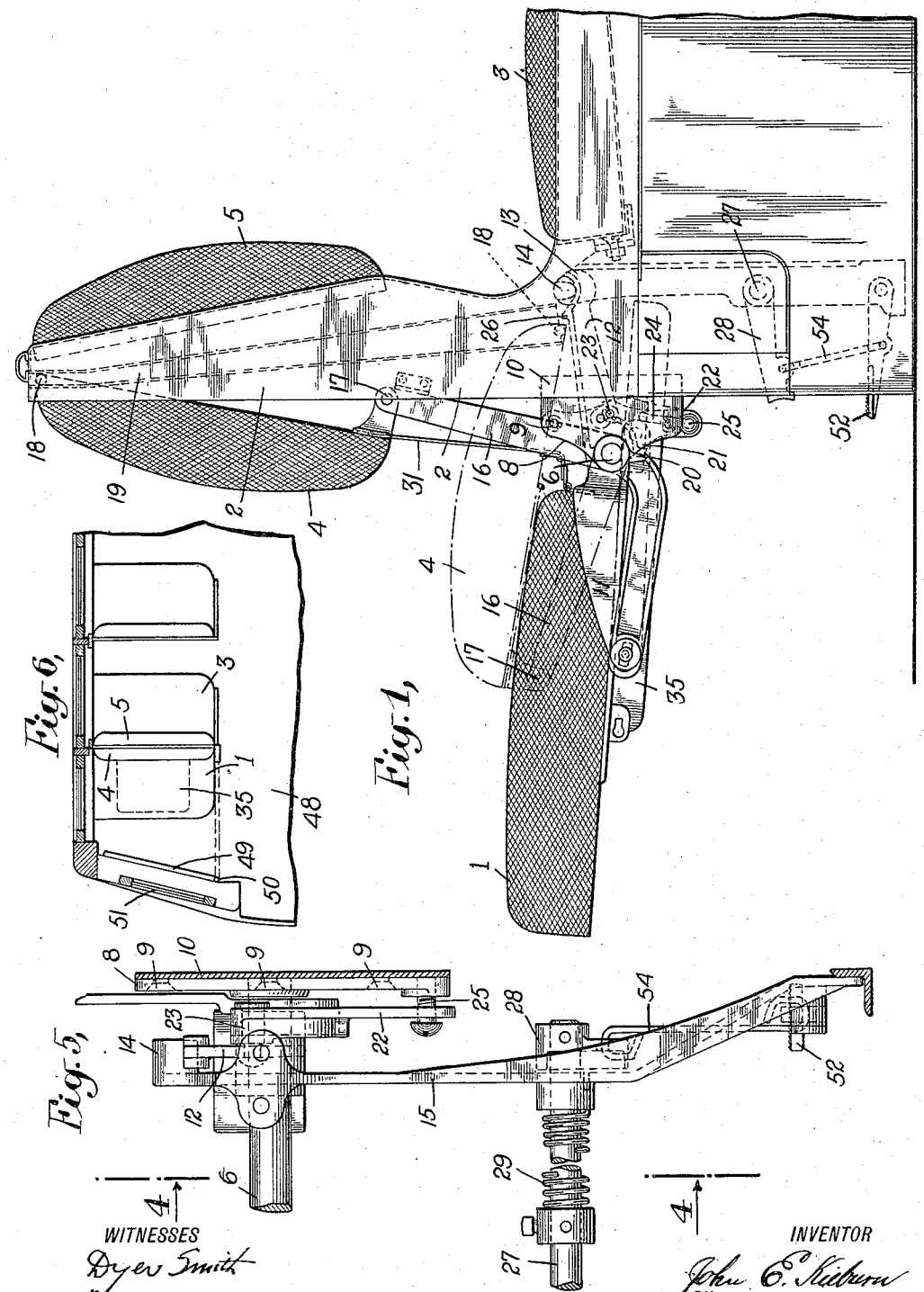

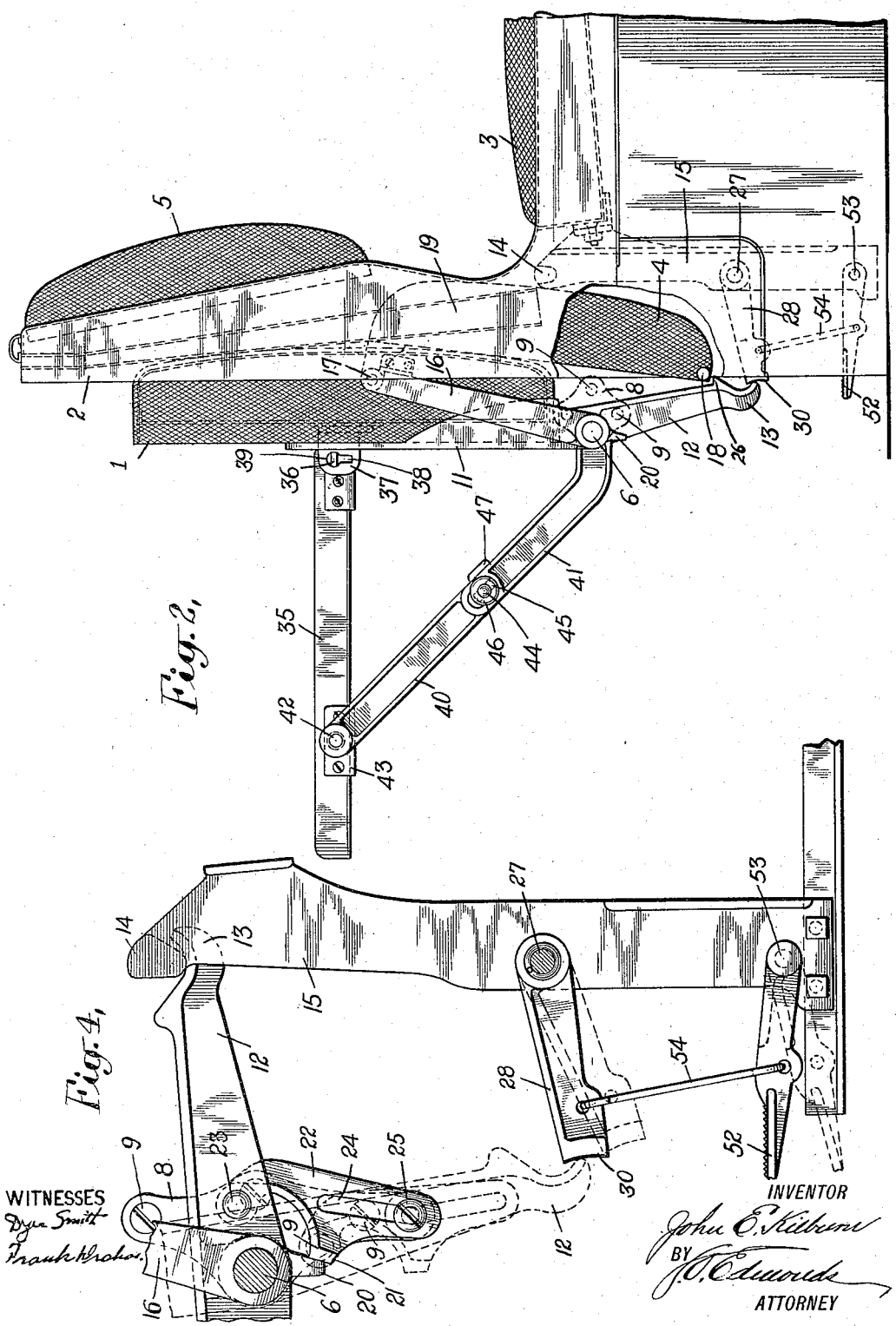

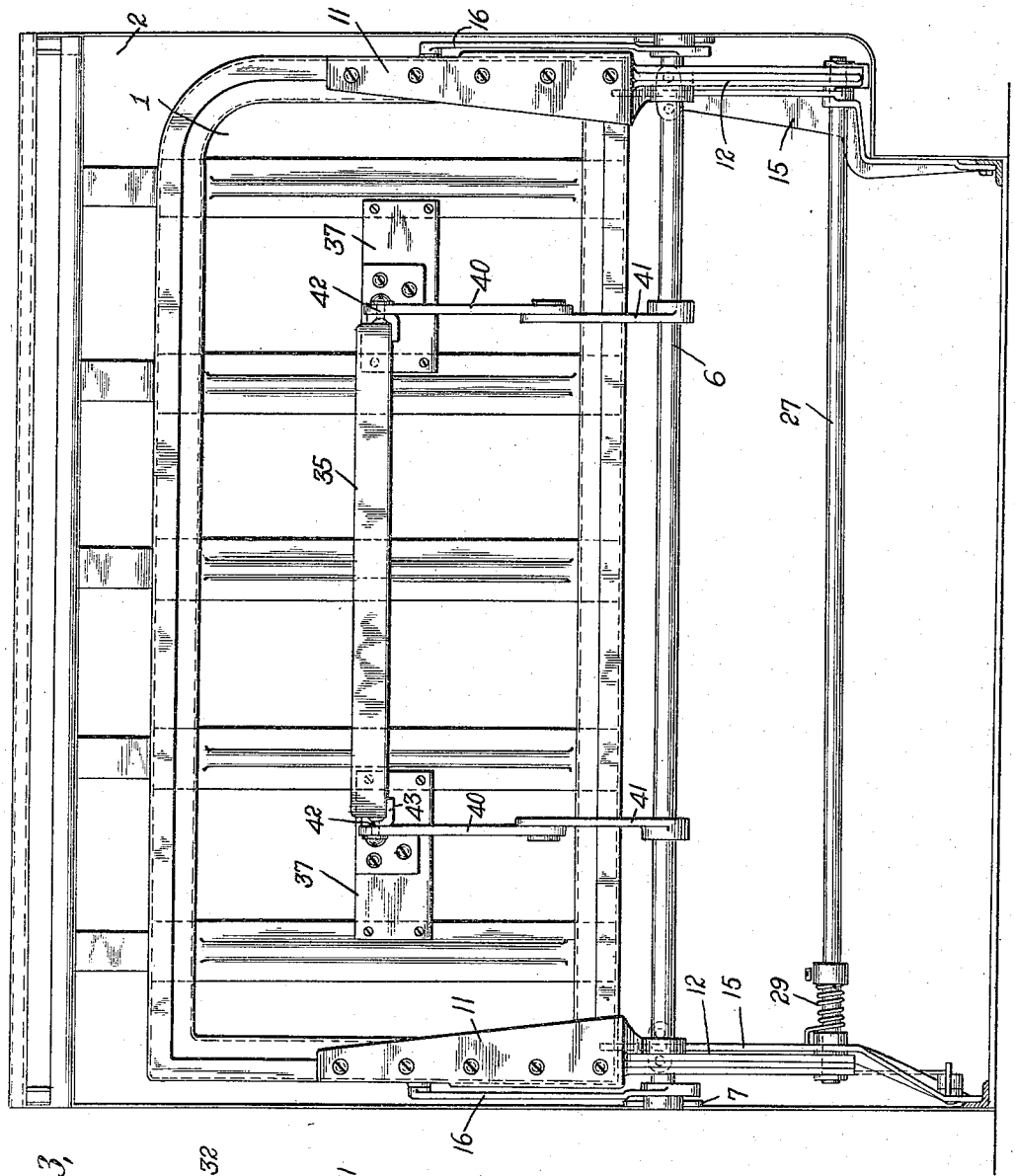
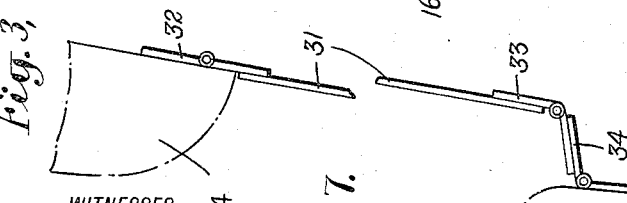
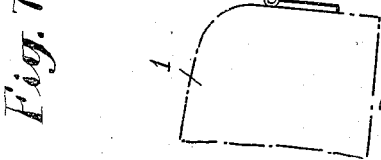

JOHN EDWIN KILBURN, OF PHILADELPHIA, PENNSYLVANIA, ASSIGNOR TO HALE & KILBURN COMPANY, OF PHILADELPHIA, PENNSYLVANIA, A CORPORATION OF DELAWARE.

CAR-SEAT CONSTRUCTION.

1,167,831. Specification of Letters Patent. Patented Jan. 11, 1916.

Application filed August 26, 1914. Serial No. 858,606.

*To all whom it may concern:*

Be it known that I, JOHN EDWIN KILBURN, a citizen of the United States, residing at Philadelphia, in the county of Philadelphia and State of Pennsylvania, have invented certain new and useful Improvements in Car-Seat Constructions, of which the following is a specification.

My invention relates to improvements in car seat constructions and particularly to a construction in which a main seat is adapted to be placed in operative and inoperative positions and an auxiliary seat provided which may be placed in operative position when the main seat is in inoperative position.

More particularly, my invention is directed toward the provision of means whereby a seat for passengers may be provided at the end of a trolley or interurban or other car employing the services of a motorman or other attendant when the space is not needed for the employee, the public or passenger seat being readily gotten out of the way and a small or auxiliary seat for the motorman provided in the same space when the same is needed. Thus in the situation which I contemplate a street railway car may be operated in one direction, the auxiliary seat being provided for the motorman at what is then the forward end of the car and the larger passenger seat moved out of the way. On the next run of the car, this end of the car may be the rear and according to the construction provided by my invention the motorman's seat is removed and the larger or main seat is adjusted into a position to accommodate passengers. Preferably, when the motorman is occupying his compartment at the forward end of the car, a door is interposed between the space and the main body of the car, and when the public seat is positioned for use in this space, the door is moved into position to conceal the brakes and controller provided for the motorman at that end of the car.

In the preferred form of my invention, there is a main or public seat with a back therefor disposed on the forward side of a supporting structure, on the rear or opposite side of which is a standard form of passenger seat. A small auxiliary seat for the motorman is secured to the under side of the movable passenger seat being pivoted thereto and folded or swung into parallel relation to the movable passenger seat, underneath the same, when out of use. When the motorman wishes to occupy his compartment, the back-cushion for the public seat is swung down upon the seat, the construction being such that it is first necessary to slightly raise the forward edge of the public seat in order to unlatch the back which may then be swung down upon the top of the public seat and substantially parallel thereto as stated. The public seat is then swung upwardly and rearwardly about the pivotal support of the seat which is located at the rear of the same, the public seat then occupying a substantially vertical position in which it is latched with its back resting behind the now vertical seat within the frame work to which the movable public seat is secured. A small motorman's seat is then swung about its pivotal connection to the now vertical public seat until the motorman's seat is in horizontal or operative position in which it is now held by a diagonal supporting arm which is readily positioned and locked after the motorman's seat has been moved into horizontal position. At the end of the run or whenever it is desired to again convert the motorman's compartment into a space for the accommodation of passengers, the operations are readily reversed, the motorman's seat being folded up under the public seat, and the latter being released from its inoperative position by a trip device, when it is again swung into horizontal position with its back in normal upright position.

The objects of my invention are the provision of improved devices of a character adapted to fulfil the functions outlined above.

Other objects of my invention reside in the construction and combinations of parts as will be more fully described in the following specification.

In order that my invention may be more fully understood, attention is hereby directed to the accompanying drawings forming part of this application and illustrating certain embodiments of my invention.

In the drawings, Figure 1 represents an end elevation of a construction embodying a fixed public seat and a movable public seat, the latter being shown in operative position with the auxiliary or motorman's seat folded underneath the same, Fig. 2 is a similar view showing the positions of the parts when the motorman's seat is in operative position, Fig. 3 is a front view of the structure, the parts being in the position shown in Fig. 2, Fig. 4 represents a section taken on line 4—4 of Fig. 5, Fig. 5 represents an enlarged detail view of certain of the operating connections, Fig. 6 is a partial diagrammatic plan view of one end of a car in which the construction described is mounted, and Fig. 7 represents an enlarged partial end view illustrating certain details of construction.

Referring to the drawings, the main or public movable seat 1 is supported from one side of the metallic frame 2 on the other side of which a stationary seat 3 is supported, a double passenger seat thus being provided, seats 1 and 3 having backs 4 and 5 respectively positioned on opposite sides of the frame member 2, the back cushion 4 being movable and the back cushion 5 being fixed in position. Seat 1 is pivotally supported from a shaft 6, one end of shaft 6 being mounted in a support 7 secured to the wall of the car as is shown in Fig. 3 of the drawings, the other end of the shaft being mounted in a bracket 8 which is secured by screws 9 to a plate 10 welded or otherwise secured to the standard 2. Arms 11 are secured to the bottom of the seat on each end of the same and are rotatably mounted on shaft 6 as shown. Arms 11 have rearwardly extending portions 12 formed integral therewith, arms 12 being provided with hook shaped ends 13 which engage the under side of lugs 14 when the seat is in operative position to support the same in such position. Lugs 14 extend laterally from members 15, one at each end of the seat, members 15 being secured to frame 2.

The back cushion 4 is supported by a pair of levers 16 pivoted at their lower ends on the shaft 6 and pivotally connected at their opposite ends to the lower end of back 4 as shown at 17. The upper end of back 4, referring to the operative position of the back shown in Fig. 1 carries at each side a pin 18 each of which is adapted to slide in a channel track 19 mounted one on each side, on the frame 2.

The back is locked in its upright position, when the seat 1 is in its operative position, by means now to be described. In the construction illustrated, arms 16 are provided with lugs 20 on the lower side of shaft 6, which lugs, when the seat is in the operative position shown in Fig. 1, press against projections 21 of a pair of members 22. Members 22 are mounted one at each end of the seat upon pins 23 carried by arms 12. Each member 22 is provided with a slot 24 in which is slidably mounted a screw 25 secured to plate 8.

In the operative position of seat 1, lugs 20 on arms 16 bear against lugs 21 on members 22 and prevent movement of the back 4 out of its operative position, members 22 being held rigidly in position at this time by means of screws 23 by which members 22 are pivotally supported from arms 12 and by screws 25 which bear against the sides of slots 24 at the lower ends of the same. When it is desired to move the passenger seat 1 into its inoperative position, back 4 is first moved down against seat cushion 1 into the position shown in dotted lines in Fig. 1. To accomplish this movement, the forward edge of seat 1 is first raised slightly which causes arms 12 and members 22 to descend sufficiently for lugs 20 on arms 16 to clear the latching members 22. Back 4 is then pulled forward at the bottom, pins 18 at the top of the back sliding down channels 19 and the pivotal supports 17 at the lower end of the back moving through an arc in a counter clockwise direction about the shaft 6 as a center into the position shown in dotted lines. The seat cushion 1 is then grasped by its front edge and swung upwardly about shaft 6 as a center into its vertical position shown in Fig. 2, the back 4 moving with seat 1 and dropping down behind the seat into the position shown in Fig. 2 in which the back is concealed within the frame member 2. When the back 4 was swung from its vertical position into the position shown in dotted lines in Fig. 1, pins 18 traveled down channels 19 to their lower ends when the edge of the back rested on lever arms 12 as is shown in dotted lines in Fig. 1. Lever arms 12 are provided with small lugs 26 adjacent to hooks 13 at the ends of the arms, and during the descent of back 4 from the dotted line position shown in Fig. 1 to the position shown in Fig. 2, the edge of the back rests on lugs 26 so that the back moves downwardly with the seat cushion.

A rod 27 is rotatably mounted in frame members 15 at each end of the seat and a pair of stop levers 28 are keyed or otherwise secured to this rod at each end of the seat, a spring 29 coiled about rod 27 and secured at its ends to one of the frame members 15 and to rod 27 serving to normally keep the outer ends of arms 28 in the position shown in Figs. 1 and 2. When the public seat 1 is swung into the vertical position shown in Fig. 2, the hooks 13 on the ends of arms 12 wipe across levers 28 depressing the same. The lower ends of arms 12 then bear against the outer concave surfaces 30 of arms 28 as shown in Fig. 2, whereby the seat 1 is locked in its vertical position.

In the construction illustrated, the lower end of the back 4 in its operative position is some distance above seat cushion 1 leaving an opening in the rear of the seat which should be filled to prevent the possible catching of a passenger's clothing. Accordingly, in the construction illustrated, I have provided a sheet-metal plate 31 extending between the back of seat cushion 1 and the lower end of back 4, this plate being hinged to the back and the seat and being of substantially the same length as the seat cushion and the back so as to fill in the space referred to. This plate is connected to the seat and the back in such manner that the seat and back may be folded and unfolded in the manner described without removing the plate. A convenient means for accomplishing this purpose is illustrated in the detail view Fig. 7 in which a hinge 32 is shown as secured to the upper end of the plate and the lower rear edge of back 4, one end of the hinge preferably being welded to the plate and the other end screwed to the back. The lower end of plate 31 is provided with a double hinge 33, 34, the upper end of hinge 33 being secured as by electric welding to the lower end of plate 31 and the lower end of hinge 34 being secured as by screws to the rear edge of cushion 1. The adjacent ends of hinges 33 and 34 may be welded together to form the double hinge described, or a double hinge may be provided in any other suitable manner. With the construction described, the plate 31 folds up when the back is swung into the position shown in dotted lines in Fig. 1, so that the plate then occupies the dotted line position shown in Fig. 1 underneath back 4.

The auxiliary or motorman's seat 35 is secured to the under side of public seat 1 in such manner that the same will extend horizontally into operative position when seat 1 is in its vertical position shown in Fig. 2 in which it is latched as noted above by the coaction of hooks 13 on arms 12 with the ends of stop levers 28. In the construction illustrated, the auxiliary seat 35 is pivoted to the bottom of public seat 1 in such manner that when out of use it may be folded up against the under side of seat 1 as shown in Fig. 1. As illustrated, seat 35 is pivoted by means of pins 36 bearing in brackets 37 secured to the under side of seat 1 as shown in Fig. 3. Brackets 37 are provided with slots 38 having circular enlargements 39 at one end thereof. When the seat 1 is in operative position with seat 35 folded up against the bottom of the same, pins 36 which have squared ends occupy the straight portions of slots 38 so that seat 35 is locked in this position. When seat 1 has been raised to its vertical position, as shown in Fig. 2, and the motorman's seat 35 is to be adjusted into its operative position, it is only necessary for seat 35 to be raised slightly so that pins 36 are brought into the cylindrical enlargements of slots 38 at the upper ends thereof after which seat 35 may be swung into the horizontal position shown in the drawing. Seat 35 is provided with two diagonal supporting arms, each comprising two members 40 and 41 connected together by a knuckle joint. The upper arm 40 of each support is pivotally mounted on a pin 42 carried by a bracket 43 secured to each side of seat 35. Members 40 and 41 are connected by a pin 44 on which the adjacent ends of arms 40 and 41 are pivoted. Pin 44 which is carried by the lower end of arm 40 has an angular or oblong portion which falls into a corresponding slot of oblong cross section 45 in the upper end of arm 41 when seat 35 is in operative position and the supporting arm has been adjusted to lock the support in position. The lower end of arm 41 is pivoted on shaft 6. When it is desired to release the lock between members 40 and 41, it is only necessary to raise seat 35 slightly above the horizontal so that the pin 44 will enter the cylindrical enlargement 46, after which the joint may be broken by swinging the arms 40 and 41 inwardly and seat 35 folded under seat 1 into the position shown in Fig. 1. Arm 40 carries at its lower end a lug 47 which bears against a shoulder on arm 41 when the diagonal support is in position to hold members 40 and 41 rigidly in position to support seat 35.

The position of the seat at one end of a car 48 is shown in the diagrammatic view Fig. 6, in which the public seat 1 is shown in operative position to form a double passenger seat with the fixed seat 3, the motorman's seat 35 being shown in dotted lines. The door 49 hinged at 50 is shown in this view as concealing the controller and brakes shown diagrammatically at 51 at the end of the car. As stated, when the motorman wishes to occupy his compartment, he first raises seat cushion 1 slightly sufficiently for lugs on the lower ends of levers 16 to clear lugs 21 on members 22, thus releasing the back 4. The back is then pulled forward at the bottom into the dotted line position shown in Fig. 1 after which the seat cushion 1 is grasped by its front edge and swung upwardly into the position shown in Fig. 2, the back 4 moving downwardly into the position shown in Fig. 2 and members 22 moving downwardly with levers 12 into the dotted line position shown in Fig. 4, members 22 being guided in their descent by screws 25 moving in slots 24. The motorman then opens door 49 which up to this time has covered the controller compartment, the door after this movement being in dotted line position shown in Fig. 6. The motorman then moves his seat 35 into its operative position as shown at Fig. 2 in which it is supported by the diagonal braces as stated, the engagement of the lower ends of arms 12 with the ends of stop levers 28 firmly supporting the parts in position. When the motorman has finished his run, he drops his small seat to a vertical position under the public seat 1 which is still in its vertical position as shown in Fig. 2, and closes door 49 over the controller compartment. It is then only necessary for the motorman to touch the foot-pedal 52 which withdraws stop arms 28 from their contact with the ends of levers 12. Foot-pedal 52 is pivoted at 53 to one of the members 15 and is connected to one of the members 28 by a link 54. Upon thus unlatching seat 1, the latter may be dropped down into the horizontal position, the auxiliary seat 35 being first folded up under the same. In this movement of seat 1, back 4 is carried along with the seat cushion by the engagement of lugs 26 on arms 12, the back 4 following seat 1 into the position shown in dotted lines in Fig. 1. It is then only necessary to grasp the end of back 4 at which pins 18 are secured and raise this end of the back a little way with pins 18 traveling in tracks 19 when the seat cushion 1 may be grasped by the front edge and raised upward thereby raising back 4 into its normal position. Upon the return of seat 1 to its normal position, the back 4 will be held securely in position by the engagement of lugs 20 on levers 16 with the coacting surfaces 21 of latch members 22.

As will readily be seen from the above description, my improved seat construction provides for a considerable economy in space in the end of the car and is easily operated by manipulations which consume only a very small length of time. It should be understood that while I have described my preferred construction in detail, my invention broadly considered is not strictly limited to the details described, but is as broad as is indicated by the accompanying claims.

Having described my invention, what I claim as new therein and desire to secure by Letters Patent of the United States is:—

1. In a car-seat construction, the combination of a support, a shaft carried thereby, a seat pivotally mounted on said shaft, and adapted to be held in operative position, a back, pivotal means supporting said back from said shaft, and means connected to said back and said seat for locking said back in operative position when said seat is in operative position, said locking means being arranged to be moved out of coöperative relation by upward movement of said seat, substantially as set forth.

2. In a car-seat construction, the combination of a support, a shaft carried thereby, a seat pivotally mounted on said shaft, and adapted to be held in operative position, a back, links supporting the lower part of said back from said shaft, means supporting the upper part of said back from said support, and means for locking said back in operative position when said seat is in operative position, said back being movable to inoperative position, when unlocked, by forward movement of the lower part thereof over said seat, substantially as set forth.

3. In a car-seat construction, the combination of a support, a seat pivotally secured thereto, at its rear edge, and adapted to be swung backwardly and upwardly to inoperative position, a back, means for latching the same in operative position when said seat is in operative position, and supporting means for said back such that, when said seat is raised, said back may be moved into parallel relation thereto by the forward movement of the lower end of said back, substantially as set forth.

4. In a car seat construction, the combination of a support, a seat pivotally secured thereto, adapted to be swung into inoperative position, a support for said seat when in operative position, a back, means for locking said back in operative position when said seat is in operative position, arranged to be released by a slight upward movement of said seat, and supporting means for said back adapted to guide said back into an inoperative position when unrestrained by said locking means, substantially as set forth.

5. In a car seat construction, the combination of a seat, a back therefor, a frame, link means pivotally connected to said back and said frame, and adapted to support said back in operative position, a track carried by said frame, and guiding means secured to said back and movable in said track, for guiding said back in a movement away from operative position, substantially as set forth.

6. In a car seat construction, the combination of a seat, a pivotal support therefor at the rear of said seat, means extending rearwardly from said seat, and movable therewith, fixed means contacted by said first means when said seat is in operative position for supporting the same, and latch means coacting with said first means when said seat is in inoperative position, to hold said seat in inoperative position, substantially as set forth.

7. In a car seat construction, the combination of a seat, a frame to which said seat is pivoted, a back, a link pivotally connected to said frame and said back for supporting the latter, and latching means carried by said seat for locking said back in operative position when said seat is in operative position, and movable out of latching position when said seat is moved out of operative position, to permit angular movement of said back against said seat, substantially as set forth.

8. In a car seat construction, the combination of a frame, a seat pivoted thereto, a back adapted to move from an operative position to a position substantially parallel to said seat, a track carried by said frame, guiding means secured to one extremity of said back adapted to travel in said track and means for guiding the opposite extremity of said back in a curved path, in the movement of said back out of operative position, substantially as set forth.

9. In a car seat construction, the combination of a frame, a seat pivoted thereto, adapted to be raised from operative position, a back, means for holding said back in operative position when said seat is in operative position, released by the slight raising of said seat, and means for guiding said back into an approximately horizontal position upon and substantially parallel to said seat when the latter is raised from operative position, substantially as set forth.

10. In a car seat construction, the combination of a frame, a seat pivoted thereto, adapted to be raised into the vertical from operative horizontal position, a back, supporting means for said back, adapted to permit the folding of said back upon said seat when the latter is raised from operative position, and means secured to said seat adapted to be contacted by and support said back thus folded when said seat is swung to a vertical position, substantially as set forth.

11. In a car seat construction, the combination of a shaft, a seat pivoted thereon adjacent its rear edge, and adapted to swing upwardly and rearwardly from horizontal position, a back adapted to swing downwardly against said seat, supporting means therefor pivoted on said shaft, and means carried by said seat to the rear of said shaft, contacted by said back supporting means when said seat is in horizontal position to prevent the downward swinging movement of said back, substantially as set forth.

12. In a car-seat construction, the combination of a frame, a pivoted main seat, adapted to swing from horizontal to vertical position, an auxiliary seat pivoted to the under side thereof, by a pin and slot connection, and a hinged diagonal supporting brace for said auxiliary seat, pivotally connected thereto, and to said frame, said pin and slot connection being so arranged as to lock said auxiliary seat in its inoperative position, said connection being adapted to be unlocked, when said main seat is in vertical position, by raising said auxiliary seat slightly, substantially as set forth.

13. In a car-seat construction, the combination of a frame, a pivoted main seat, adapted to swing from horizontal to vertical position, an auxiliary seat pivoted to the under side thereof, and adapted to swing from a position parallel to said main seat to a position at an angle thereto, and a brace for supporting the outer end of the same when said auxiliary seat is in horizontal position, said brace comprising arms pivoted to said seat and said frame, and connected together by a pin and slot connection, arranged to lock said arms together when said auxiliary seat is in operative position, said connection being adapted to be unlocked by raising said auxiliary seat, substantially as set forth.

This specification signed and witnessed this 24th day of August, 1914.

JOHN EDWIN KILBURN.

Witnesses:
JOHN B. KILBURN,
PETER J. TUCKER.

Copies of this patent may be obtained for five cents each, by addressing the "Commissioner of Patents, Washington, D. C."